Patented Jan. 23, 1923.

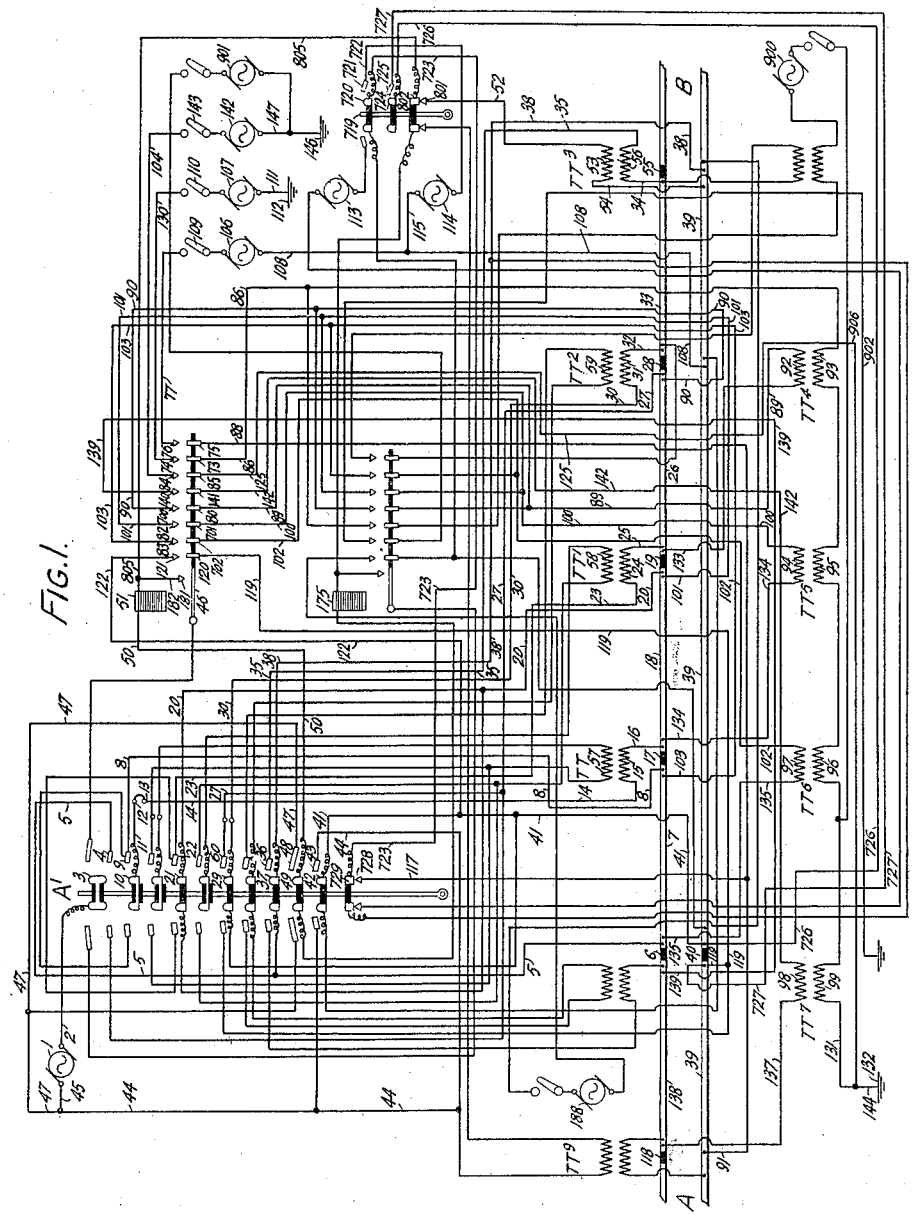

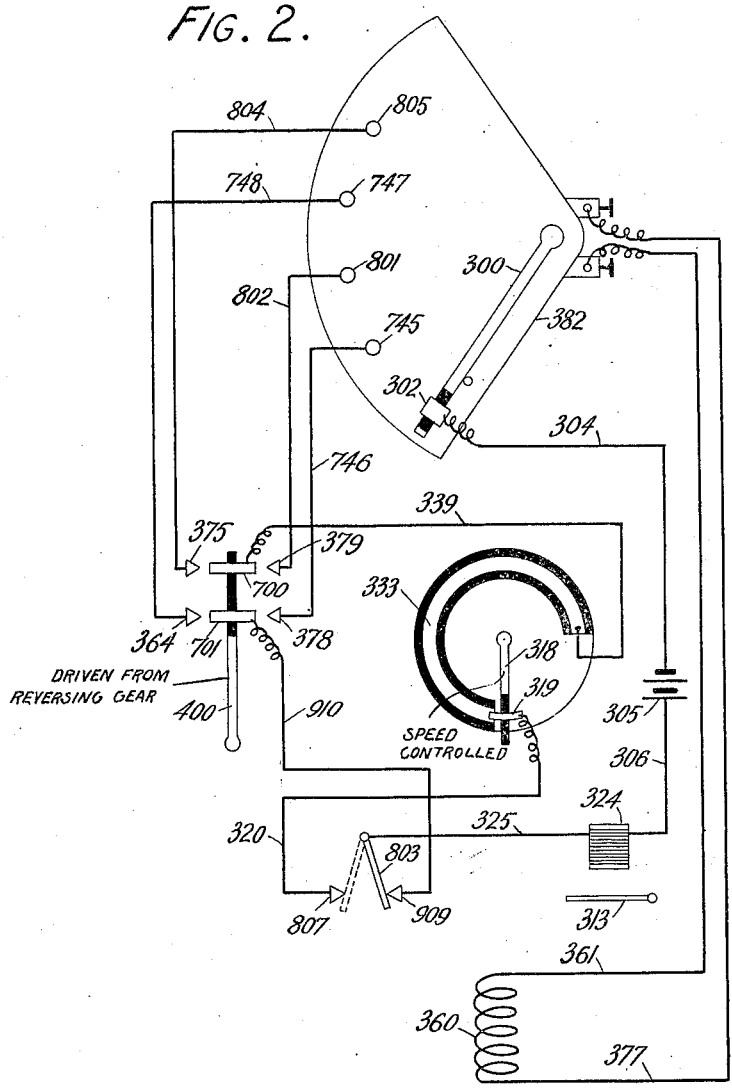

1,443,305

UNITED STATES PATENT OFFICE.

ARTHUR REGINALD ANGUS, OF WESTMINSTER, LONDON, ENGLAND.

CONTROL OF TRAINS.

Application filed August 1, 1922. Serial No. 578,997.

*To all whom it may concern:*

Be it known that I, ARTHUR REGINALD ANGUS, a subject of the King of Great Britain and Ireland, and a resident of Westminster, in the county of London, England, have invented certain new and useful Improvements in or Relating to the Control of Trains, of which the following is a specification.

The invention forming the subject-matter of the present application relates to electrical train controlling apparatus such that the occupancy of a portion of the track by a railway vehicle normally prevents a locomotive located in that portion of track from approaching the vehicle by preventing the electrical energization from the track of a part carried by the locomotive.

Now according to the present invention, in order to render it possible for the locomotive when necessary to approach the vehicle, the train-controlling apparatus is adapted to enable a signalman and the locomotive driver to adjust respectively the track and locomotive portions of the train-controlling apparatus to co-operative abnormal positions and thus to cause a part of the apparatus located on the locomotive to be energized by electricity and thereby to enable the locomotive to approach the vehicle.

In order to impose a suitably low speed limit on the locomotive on such occasions, means are provided for causing a stopping operation to be performed on the locomotive if the locomotive travel at a speed that is greater than a predetermined low speed, notwithstanding the adjustment of the track and locomotive portions of the train-controlling apparatus to the co-operative abnormal positions.

The invention is illustrated by the accompanying drawings which represent diagrammatically an example of apparatus according thereto, Fig. 1 showing track apparatus and Fig. 2 train apparatus suitable for use therewith.

The apparatus shown in Fig. 1 is for controlling the passage of trains in both directions along a single track between two places A and B. The track is divided by insulations into sections and the rails of each side of the track are except where separated by insulation, conductively connected together. In order that for normal working a train located between insulations 118 and 6 near A may run towards B a switch arm A′ is moved so that inter alia its insulated contact 3 effects contact with a contact 4 so that current passes from a source of alternating current 1 by way of a wire 2, the contact 3 of the switch arm A′, the contact 4, a wire 5 to the rails 7 close to the insulation 6, by way of the rails 7, a wire 8, a contact 9, an insulated contact 10 of the switch arm A′, a wire 11, two contacts 12 and 13 (which are normally bridged by a conductor or wire but may be connected together by a testing instrument), a wire 14, the primary winding 15 of a transformer TT, a wire 16, to the rails 18 near an insulation 17, by way of the rails 18, a wire 20, an insulated contact 21 of switch arm A′, a contact 22, a wire 23, the primary winding 24 of a transformer TT¹, a wire 25 to the rails 26 near an insulation 19, by way of the rails 26, a wire 27, a contact 60, an insulated contact 29 of the switch arm A′, a wire 30, the primary winding 31 of a transformer TT², a wire 32 to the rails 33 near an insulation 28, by way of the rails 33 to near an insulation 55, thence by way of a wire 34, the primary winding 56 of a transformer TT³, a wire 35, a contact 36, an insulated contact 37 of the switch arm A′, a wire 38, to rails 39 opposite to insulation 55, thence by way of the rails 39 to near to an insulation 40 thence by way of a wire 41, an insulated contact 42 (of the switch arm A′), a contact 43, a wire 44, and a wire 45 back to the source 1. If all is in order the energization of the said transformer TT, TT¹, TT² and TT³ will cause by induction the respective secondary windings 57, 58, 59 and 93 to be energized. 12 and 13 indicate connection terminals for the switchboard. When all is in order and no railway vehicle is on any section then as the said primary winding 56 (of the said transformer TT³ acting as an auto-transformer) is energized its relative secondary winding 53 has energy induced therein which passes by way of a wire 52 a contact 801, an insulated contact 802 on the switch arm 719 (the contacts 801 and 802 being in contact if the switch arm 719, the function of which will be hereinafter described, is, as shown, in its neutral position), and a wire 805 to an electromagnet 51 energizing it, thence by way of a wire 50, an insulated contact 49 (of the switch arm A′), a contact 48, a wire 47, the wire 44, the contact 43, the contact 42 on the switch arm A′, and the wire 41, to the rails 39, and thence by way of wire 54, back to the secondary coil 53 of transformer TT³. A portion of the current supplied to the primary 56 of the transformer TT³ returns to the generator 1 by way of the wire 35, the contacts 36 and 37 the wire 38, the rails 39, the wire 54, the secondary winding 53 of the transformer TT³, the wire 52, the contacts 801 and 802, the wire 805, the electromagnet 51, the wire 50, the contacts 49 and 48 and the wires 47 and 45, but by suitably adjusting the relationship between the resistance of this path and that of the main return path through the rails 39 this current can be made of such a value that its effect upon the energization of the electromagnet 51 is inappreciable. The energization of the electromagnet 51 causes its armature 46 to move so that, inter alia, its insulated contact 75 effects contact with a contact 76 and current passes from some suitable source of electricity 106 by way of a switch 109, a wire 77, the contact 76, the insulated contact 75 (of the armature 46) a wire 88, and a wire 91, to the rails 39 (opposite the insulation 118), thence along the rails 39 to a point close to the insulation 40, thence by way of a wire 119, an insulated contact 120 (of the armature 46), a contact 121, a wire 122, and a wire 41, to the rails 39 (close to the insulation 40), thence along the rails 39 to a point opposite the insulation 28, and thence by way of a wire 108 back to the source 106. As the electro-magnet 51 has become energized and has raised its armature, it is possible by moving the switch arm A′ farther to the right, to break the circuits above described which lead through the primaries of the transformers TT, TT¹, TT², TT³. The armature of the electro-magnet 51 is held in raised position by current flowing through the long contacts opposite contacts 3 and 49 on switch arm A′, even after the movement of the arm A′ has opened the circuits over the shorter contacts. This circuit is: generator 1, wire 2, contact 3, to armature 46, contact 181, magnet 51, wire 50 to contact 49, contact 48, wires 47, and 45 back to the generator; the primary circuits of the transformers TT, TT¹, TT², and TT³ being thus broken, no testing current flows through the rails 7, 18, 26, 33, and 39, The current supplied to the train standing between the insulations 6 and 118 is adapted to prevent the production of a warning or stopping operation thereon by apparatus adapted to produce such an operation in the absence of the flow therethrough of current suitable for restraining the production of such operation and thus permits the train to pass from A towards B up to the said insulation 28. One route for the transmission of current to the apparatus on the train is thus provided in the manner hereinbefore described. To enable the train to pass beyond the insulation 28 in the direction from A towards B, the railway track beyond the insulation 28 is provided with apparatus similar to that hereinbefore described. If the train should attempt to pass beyond the insulation 28 when the road beyond this position is not made there will then be no electrical energy delivered to the rails beyond the insulation 28 (as by assumption this part of the track has not had a road made thereon) and so a warning or stopping operation will be produced on the train.

The movement of said armature 46 (when its electromagnet 51 is duly energized) closes, inter alia, part of the circuit relating to a source of electricity 107 through a simple switch 110 (whereby the circuit relating to said source 107 may be independently opened and closed), so that current flows from said source 107 by way of the switch 110, a wire 130, a contact 74, an insulated contact 73 (of the armature 46) and a wire 86 to the primary windings 93, 95, 96, and 99 of transformers TT⁴, TT⁵, TT⁶, and TT⁷ respectively; thence by way of a wire 131 to an earth plate 132, thence by way of earth to an earth plate 112 and thence by way of a wire 111 back to the source 107 and thus the relative secondary windings 92, 94, 97, and 98 of said transformers TT⁴, TT⁵, TT⁶, and TT⁷ respectively are energized and current flows as follows: (a) from the secondary winding 92 by way of a wire 133, to the rails 26 near the insulation 19, thence along the rails 26 to a point near the insulation 28, thence by way of a wire 90, a contact 700, an insulated contact 80 (of the armature 46) and a wire 89 back to the secondary winding 92; (b) from the secondary winding 94 by way of a wire 134 to the rails 18 near the insulation 17, thence along the rails 18 to a point near the insulation 19, and thence by way of a wire 101, a contact 82, an insulated contact 701 (of the armature 46) and a wire 100 back to the said secondary winding 94; (c) from the secondary winding 97 by way of a wire 135 to the rails 7 near the insulation 6, thence along the rails 7 to a point near the insulation 17, and thence by way of a wire 103, a contact 83 an insulated contact 702 (of the armature 46) and a wire 102, back to the secondary winding 97; and (d) from the secondary winding 98 by way of a wire 137 to rails 138 near the insulation 118, thence along the rails 138 to a point near the insulation 6, and thence by way of a wire 139, a contact 140, an insulated contact 141 (of the armature 46), and a wire 142 back to the secondary winding 98. Thus when all is in order current for preventing the production on the train of a warning or stopping operation and so enabling the train to proceed on the "down" journey—i. e., in the direction from A towards B—may be supplied to the rails on the side of the track opposite to the rails to which current is supplied by the source 106; in this way a second route is provided for the transmission of current to the train apparatus.

Again in order to supply current for enabling a train to proceed on the "down" journey by means of a conductor 906 placed suitably adjacent to the track rails a switch arm 143 is moved and current passes from a suitable source 142 by way of the switch arm 143, a wire 104 a contact 84, an insulated contact 85 (of the armature 46), and a wire 125 to the conductor 906, thence by way of the wire 144, to the earth plate 132, thence by way of the earth to an earth plate 146, and thence by way of a wire 147 back to the source 142; in this way a third route is provided for the transmission of current to the train apparatus. The restraining apparatus on the train has suitable receiving means, as induction coils, suitably placed in relation to the rails of each side of the track and to the conductor 906.

The operation of the switch arm A' and its connexions for testing and making the road in the direction from B towards A are similar to those just described for testing and making the road in the direction from A towards B but the switch arm A' is for that purpose moved to the left and the secondary of the transformer TT⁹ (used for "up" journey testing) which corresponds in function to the transformer TT³ is adapted to be connected by means of conductors that do not include rails to an electromagnet 175 (used for the "up" journey) which corresponds in function to the electromagnet 51 to which one pole of the secondary 53 of the transformer TT³ is adapted to be connected by way of the rails 39. For the "up" journey—i. e., for the journey in the direction from B towards A—the train is supposed to be located between the insulations 28 and 55 and the testing is effected of the track from the insulation 28 to the insulation 118 and the train current is supplied from the insulation 55 to the insulation 6: for the "up" road the generators 188, 900, and 901 correspond respectively to the generators 106, 107, and 142 for the "down" road, and a conductor 902 extending along the track close to the rails of one side thereof corresponds to the conductor 906 for the "down" road.

In the example shown in Fig. 1, the sources of electricity 1, 106, 107, 142, 188, 900, and 901 are sources of alternating current, the sources 106, 107, and 142 being adapted to supply alternating current of one frequency and the sources 188, 900, and 901 being adapted to supply alternating current of another frequency and the apparatus on the trains is adapted to give clearance for the two directions of travel only when receiving current of the one or the other frequency that is appropriate to the direction of travel.

The current used for track testing should be different, as in strength or frequency, from current employed for giving clearance and should not be adapted to produce clearance operations.

The presence of a vehicle on the portion or section of the track between the insulations 118 and 28 would normally, as hereinbefore described, prevent a train clearance current from being supplied to a locomotive so as to enable it to approach the vehicle on the up journey because the vehicle would short-circuit the primary of the transformer TT⁹ or a corresponding relay the energization of which is necessary for the energization of the electromagnet 175 and the consequence completion of a circuit for supplying clearance current to the locomotive. To enable the locomotive, notwithstanding the presence of the vehicle, to approach the vehicle along that portion of track, the switch arm A' is restored to its neutral position and the switch arm 719 is moved so that its insulated contact 720 comes into contact with a contact 721 and its insulated contact 724 comes into contact with a contact 725 and thus a circuit is completed allowing current to flow from an alternating-current generator 114, by way of a wire 115, and a wire 108, to the rails 39 opposite the insulation 28, thence along the rails 39 to a point near the insulation 40, thence by way of a wire 726, the contacts 724 and 725, and a wire 727, to the rails 39 on the other side of the insulation 40, thence along the rails 39 to a point opposite the insulation 118, thence by way of the wire 91, a wire 117, a contact 728, an insulated contact 729 on the switch arm A' (only when the switch arm A' is, as shown, in the neutral position), a wire 723, the contacts 720 and 721, and a wire 722 back to the generator 114. The alternating current thus supplied to the rails by the generator 114 differs from the alternating current or currents nomally supplied for giving the locomotive clearance, and a clearance circuit on the locomotive will be closed partly owing to the abnormal position of a movable part of an instrument thereon that is adapted to be energized by the alternating current induced in the said instrument by the current in the rails and partly owing to the abnormal position of a special switch which must for this purpose be moved by the driver of the locomotive into the circuit-closing position. Similar means are provided, as shown, for enabling a locomotive to approach, on the down journey, a vehicle occupying the portion of track between the insulation 55 and 6.

In order that no train-clearance circuit may be made by the movement of the switch arm A' from its neutral position except when the switch arm 719 is in its neutral position and that no train-clearance circuit can be made by the movement of the switch arm 719 except when the switch arm A' is in its neutral position, the circuits of the electro-magnets 175 and 51 are adapted, as shown, to be closed by contacts carried by the switch arm 719 but to be so closed only when the arm 719 is in its neutral position— i. e., its neutral position in relation to the abnormal-working circuits that it is adapted in conjunction with the switch arm A' to close for the purposes of this invention—and the abnormal circuits adapted to be closed by the switch arm 719 are adapted as shown, to be closed by contacts carried by the switch arm A' but to be so closed only when the arm A' is in its neutral position—i. e., its neutral position in relation to the normal-working circuits that it is adapted to close.

The alternating train-clearance current caused by the generator 114 or the generator 113, according to the position of the switch arm 719 and to the direction in which it is desired that the locomotive shall travel, to flow through the rails 39 as hereinbefore described, induces in an induction device 360 (which is shown diagrammatically in Fig. 2 as a single coil although it may, of course, comprise more than one coil) of the train a corresponding alternating current which, by means of wires 361 and 377, flows to and from an instrument 382 having a movable part adapted, if the instrument be energized by currents of the different frequencies to be employed, to occupy different positions respectively. When the instrument is energized by current of the frequency to permit the train to travel in the down direction its movable part moves an arm 300 into a position in which its insulated contact plate 302 makes contact with a contact 801. A switch arm 803 is adapted to occupy a normal-working position as shown in full lines in which it makes contact with a contact 909 and an abnormal-working position shown in dotted lines in which it makes contact with a contact 807 and into which it is moved by the driver of the locomotive when it is desired that the locomotive should approach a vehicle occupying a portion of track that the locomotive would normally be prevented from entering by its occupancy. When the switch arm 803 is in the abnormal-working position and the instrument 382 is energized as aforesaid, the production of a stopping operation is prevented if the speed of the locomotive does not exceed a certain low speed corresponding to a contact plate 333, whilst if that speed is exceeded the production of a stopping operation is no longer restrained and the locomotive is prevented from proceeding: if the speed of the locomotive does not exceed the aforesaid low speed, current flows from a generator 305 on the locomotive by way of a wire 306, an electromagnet 324 (which, when energized, is adapted to restrain by means of its armature 313 the production of a stopping operation), a wire 325, the switch arm 803, the contact 807, a wire 320, an insulated contact 319 on an arm 318 the position of which depends on the speed of the locomotive, the contact plate 333 (in contact with the insulated contact 319 only when the speed of the locomotive does not exceed the low speed to which the contact plate 333 corresponds), a wire 339, a contact 700 carried by but insulated from a switch arm 400 adapted to be in one or the other of two different positions in accordance with the direction of running of the train (as by being connected with the reversing gear of the locomotive), a contact 379 with which the contact 700 is in contact when the reversing gear of the locomotive is set for the train to run in the down direction, a wire 802, the contact 801, and back to the generator 305 by way of the insulated contact plate 302, and a wire 304: if the speed of the locomotive exceeds the aforesaid low speed the arm 318 moves its insulated contact plate 319 out of contact with the contact plate 333 and thus breaks the circuit of the electromagnet 324 and a stopping operation is consequently produced on the locomotive. If the rails 39 are not supplied with current for the abnormal working, the arm 300 (which when the instrument 382 is not energized is held by gravity against a stop) is not moved so as to bring its contact plate into contact with the contact 801, and, as, consequently, the electromagnet 324 is not energized, a stopping operation is produced on the locomotive.

During the normal-working for travel in the down direction the inducting current is of such a frequency as to cause the arm 300 to occupy a position in which its insulated contact plate 302 makes contact with a contact 745 and the switch arm 803 is in the position indicated by full lines in Fig. 2; current consequently flows from the generator 305, by way of the wire 306, the electromagnet 324, the wire 325, the switch arm 803, the contact 909, a wire 910, a contact 701 carried by but insulated from the switch arm 400, a contact 378, a wire 746, the contact 745, the insulated contact plate 302, and back to the generator 305 by way of the wire 304, the production of a stopping operation thus being restrained.

The operation of the apparatus when the train is running in the up direction is similar to that described with reference to the down direction, the switch arm 400 being in the position in which its contacts 700 and 701 make contact with contact 375 and 364 respectively when the reversing gear is set for the train to run in the up direction, and when the instrument 382 is energized by currents of frequencies to permit the train to travel in the up direction the arm 300 is moved so that its insulated contact plate 302 makes contact with a contact 805 for current of the frequency for abnormal working, and with a contact 747 for current of the frequency for normal working.

Instead of employing currents of different sets of frequencies for the opposite directions of travel, currents of one set of strengths may be employed for permitting the train to travel in the down direction and currents of another set of strengths may be employed for permitting the train to travel in the up direction, the instrument 382 being then adapted when energized by currents of various strengths induced in the device 360 by the track currents of the several strengths employed respectively, to cause its arm 300 to make contact with its several contacts respectively as hereinbefore described with reference to currents of the several frequencies mentioned.

If it is not desired to limit the speed for the abnormal working, the wire 320 should be connected with the wire 339 directly and not, as shown, through the contact plates 319 and 333.

In Fig. 2 the induction device 360 is diagrammatically represented as a single coil only but in order to obtain the best results there should be placed on the locomotive and also if required on a vehicle or vehicles attached thereto a number of coils which may extend all along the locomotive and should be placed as close as practicable to the track rails and/or the conductor arranged close thereto and of course on both sides of the locomotive if the rails on both sides of the track are to be employed.

When the invention is used in connexion with electric trains the current supplied to the track rails for the purposes of this invention should, of course, so differ from the propulsion current as not to be interfered with thereby as far as the operations hereinbefore described are concerned—for example, if alternating or pulsating unidirectional current at one frequency is used for the propulsion, alternating currents at frequencies different from that used for propulsion may be used for the train-controlling currents and, except in the case of the conductor parallel to the track, train-controlling current are preferably supplied by means of transformers or induction coils and preferably at a higher voltage or voltages than the propulsion current.

I claim:—

1. Electrical train controlling apparatus comprising locomotive apparatus, including an electro-responsive means whose movable part is adapted in accordance with a line-clear and a danger condition as to electrification of said electro-responsive means, to occupy a restraining position in which it is adapted to permit the train to proceed and a train stopping position in which it is adapted to stop the train, and a speed responsive part adapted to change its position in accordance with the speed of the locomotive and, pertaining to a portion of track, track apparatus adapted to be adjusted by a signal man both into a normal position and into an abnormal position and when in said normal position to be caused by the occupation by another vehicle of said portion of track to prevent said electro-responsive means on said locomotive from assuming the line-clear condition as to electrification, said locomotive apparatus being adjustable into an abnormal position and together with said track apparatus being adapted when simultaneously in said abnormal positions and said speed responsive part is occupying a position corresponding to a speed not greater than a predetermined low speed to cause said electro-responsive means to be in its said line-clear condition.

2. Electrical train controlling apparatus comprising locomotive apparatus including a first electro-responsive means adapted when energized to permit the train to proceed, a second electro-responsive means adapted according to two conditions as to electrification to cause its movable part to occupy two positions, and a manually operatable movable part adapted to be adjusted by the driver into two positions corresponding respectively to the two positions which the movable part of said second electro-responsive means is adapted to occupy and only when its position corresponds to the position for the time being of the last mentioned movable part to cooperate therewith including said first electro-responsive means electrically in circuit, and, pertaining to a portion of track, track apparatus adjustable by a signal man both into a normal position in the case of which said track apparatus is adapted to cause said second electro-responsive means to assume a predetermined one of said two conditions as to electrification when said portion of track is unoccupied by another vehicle and in the case of which said track apparatus is adapted to be caused, by the occupation of said portion of track by another vehicle, to prevent said locomotive from approaching said other vehicle along said portion of track by preventing said second electro-responsive means from assuming either of its said two conditions as to electrification and also into an abnormal position in the case of which said track apparatus is adapted to cause said second electro-responsive device to assume the other of its said two conditions as to electrification notwithstanding the occupancy of said portion of track by another vehicle.

3. Electrical train controlling apparatus comprising locomotive apparatus including a first electro-responsive means adapted when energized to permit the train to proceed, a second electro-responsive means adapted according to two conditions as to electrification to cause its movable part to occupy two positions, a speed responsive part adapted to change its position in accordance with the speed of the locomotive, and a manually operatable movable part adapted to be adjusted by the driver into (a) a first position corresponding to one of said two positions which the movable part of said second electro-responsive means is adapted to occupy and when in this position to cooperate with the last mentioned movable part and with the speed responsive part in including said first electro-responsive means electrically in circuit only if said speed responsive part occupy a position which corresponds to a speed that is not above a predetermined low speed and (b) a second position corresponding to the other of said two positions which the movable part of said second electro-responsive device is adapted to occupy and when in this position to cooperate with the last mentioned movable means but not with said speed responsive means in including said first electro-responsive means electrically in circuit, and, pertaining to a portion of track, track apparatus adjustable by a signal man both into a normal position in the case of which said track apparatus is adapted to cause said second electro-responsive means to assume a condition as to electrification corresponding to the second position of said manually operatable movable means when a portion of said track to which said track apparatus pertains is unoccupied by another vehicle and in which said track apparatus is adapted to be caused, by the occupation of said portion of track by another vehicle, to prevent said locomotive from approaching said other vehicle along said portion of track by preventing said second electro-responsive means from assuming either of its said two conditions as to electrification, and also into an abnormal position in the case of which said track apparatus is adapted to cause said second electro-responsive device to assume the other of its said two conditions as to electrification notwithstanding the occupancy of said portion of track by another vehicle.

Signed at London, England, this 21st day of July, 1922.

ARTHUR REGINALD ANGUS.